United States Patent
Rom et al.

(10) Patent No.: US 6,252,849 B1
(45) Date of Patent: Jun. 26, 2001

(54) FLOW CONTROL USING OUTPUT PORT BUFFER ALLOCATION

(75) Inventors: Raphael Rom, Palo Alto; Asad Khamisky, Fremont, both of CA (US); Moshe Sidi, Haifa (IL)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/107,881

(22) Filed: Jun. 30, 1998

(51) Int. Cl.$^7$ .................................................. H04L 12/56
(52) U.S. Cl. ............................................ 370/230; 370/417
(58) Field of Search .................... 370/229, 230, 370/428, 417, 418, 429, 235, 231, 412, 413, 236, 395

(56) References Cited

U.S. PATENT DOCUMENTS

| | | | |
|---|---|---|---|
| 4,516,122 | 5/1985 | Tomikawa | 340/825.5 |
| 5,022,046 | 6/1991 | Morrow, Jr. | 375/1 |
| 5,134,615 | 7/1992 | Freeburg et al. | 370/95.3 |
| 5,475,679 | * 12/1995 | Munter . | |
| 5,491,812 | 2/1996 | Pisello et al. | 395/500 |
| 5,493,566 | * 2/1996 | Ljungberg . | |
| 5,642,936 | 7/1997 | Evans | 128/630 |
| 5,666,525 | 9/1997 | Ross | 395/602 |
| 5,668,988 | 9/1997 | Chen et al. | 395/612 |
| 5,673,257 | 9/1997 | Crayford | 370/231 |
| 5,784,358 | * 7/1998 | Smith et al. | 370/230 |
| 5,818,839 | * 10/1998 | Sterne et al. | 370/391 |
| 5,859,835 | * 1/1999 | Varma et al. | 370/229 |
| 5,956,342 | * 8/1999 | Manning | 370/414 |
| 5,978,359 | * 11/1999 | Caldava et al. | 370/236 |
| 6,067,301 | * 5/2000 | Aatresh | 370/418 |

FOREIGN PATENT DOCUMENTS

WO 98/11697    3/1998    (WO) .

OTHER PUBLICATIONS

"Gigabit Ethernet Full–Duplex Repeaters", Brian Macleod, XP–000720916, pp. 501–509.

"Flow Control Congestion Avoidance In Switched Ethernet LANs", Jing–Fei Ren and Randall Landry, Core Network Technology, Texas Instruments, Inc., XP–000740288, pp. 508–512.

(List continued on next page.)

*Primary Examiner*—Douglas Olms
*Assistant Examiner*—Ken Vanderpuye
(74) *Attorney, Agent, or Firm*—Skjerven Morrill MacPherson LLP; David G. Dolezal

(57) ABSTRACT

A system for implementing flow control in an information network such as a local area network (LAN) utilizing a Carrier Sense Multiple Access with Collision Detection (CSMA/CD) as specified by the IEEE standard 802.03. The information network transmits computer information such as computer data between various computer systems coupled to the information network. The information network includes information network switches capable of routing information packets received via its input ports to its output ports. The received packets are held in buffers of the output ports before being transmitted via the output ports. A portion of each output port buffer is allocated to each input port. The information network switch provides a control packet such as a PAUSE frame to an upstream source operably coupled to the input port in response to the level occupancy of the portion of the buffer allocated to the input port exceeding a first level. The PAUSE frame inhibits the upstream source from transmitting information packets to the input port. In one system, each up stream source has the capability of ignoring the control packet when the level of occupancy of an output buffer of the upstream source exceeds a threshold level.

41 Claims, 11 Drawing Sheets

OTHER PUBLICATIONS

"Flexible Broadband Packet Switch For A Multi–Media Integrated Network", Clark B. Woodworth, Mark J. Karol, and Richard D. Gitlin, AT&T Bell Laboratories, XP 000269383, pp. 78–85.

Dr. Riaz Ahmad and Michael Spratt; *Flow Control Across IEEE 802.12 Switched Networks*," Nov. 1995, pp. 1–30.

"*Supplement to Carrier Sense Multiple Access with Collision Detection (CSMA/CD): Access Method and Physical Layer Specification,* " Feb. 19, 1996, pp. 1–107.

Michael D. Schroeder et al.; Autonet: A high–Speed, Self–Configuring Local Area Network Using Point–to–Point Links; IEEE Journal on Selected Areas in Communications, vol. 9, No. 8, Oct. 1991; New York, US; (18 pages).

* cited by examiner

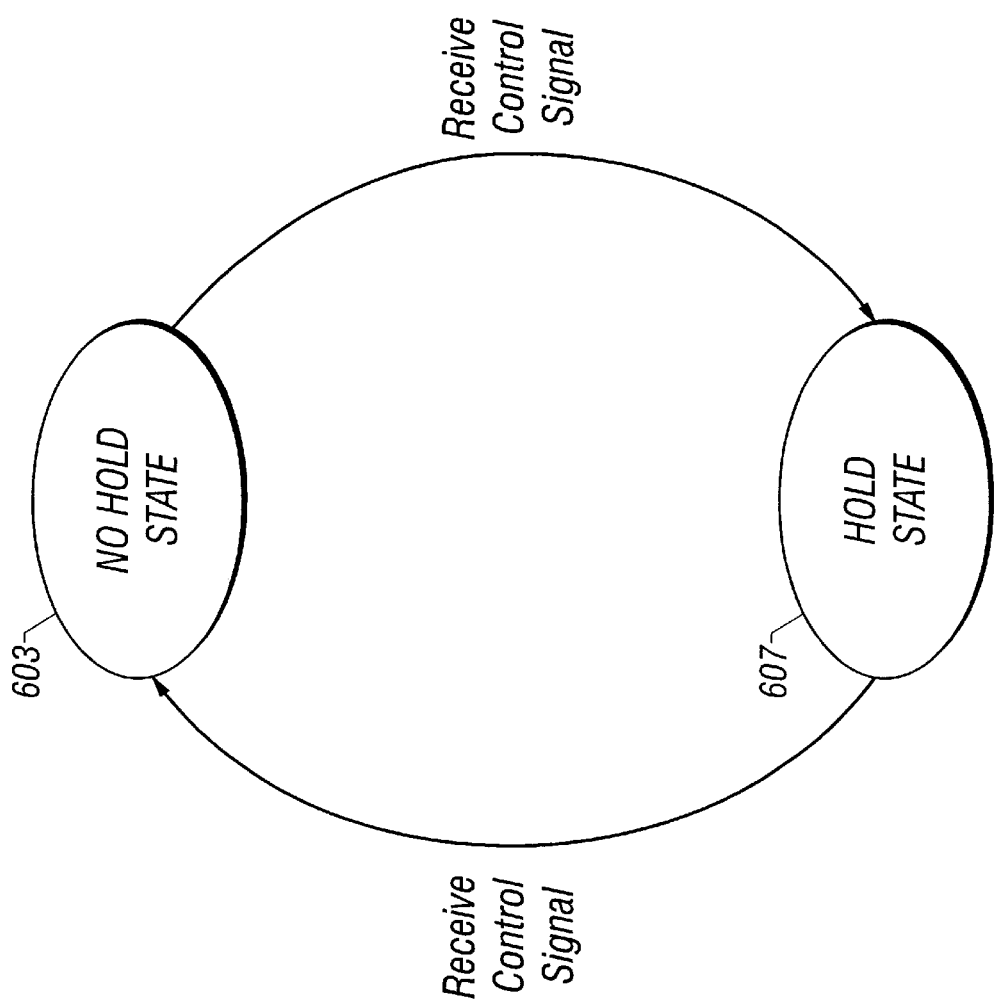

FLOW CONTROL USING OUTPUT PORT BUFFER ALLOCATION

BACKGROUND OF THE INVENTION

1. Field of the Invention

This invention relates to information networks for computer systems and more specifically to systems for implementing flow control in an information network.

2. Description of the Related Art

Information networks transmit computer information such as computer data between various computer systems operably coupled to the information network. One type of information network is a local area network (LAN) utilizing a Carrier Sense Multiple Access with Collision Detection (CSMA/CD) as specified by the IEEE standard 802.03, which is hereby incorporated by reference in its entirety. One problem with an information network is how to regulate the information being transmitted on the network such that the amount of information being transmitted does not overload the network. Another problem is how to fairly allocate the network resources among a multitude of users operably coupled to the system.

SUMMARY OF THE INVENTION

It has been discovered that allocating portions of an output buffer of an information network switch among input ports of the information network switch advantageously provides a flow control method that fairly allocates network resources among the information packet generators and sinks operably coupled to the network.

In one aspect of the invention, an information network switch includes a first input port for receiving information packets and a second input port for receiving information packets. The first input port has an enabled state and a disabled state, and the second input port has an enabled state and a disabled state. The information network switch also includes an output port for transmitting information packets. The output port includes a buffer for holding received information packets to be transmitted from the output port. A first portion of the buffer is allocated for holding information packets from the first input port and a second portion of the buffer is allocated for holding information packets from the second input port. The first input port transits to the disabled state from the enabled state in response to a level of occupancy of the first portion of the buffer exceeding a first level. The second input port transits to the disabled state from the enabled state in response to a level of occupancy of the second portion of the buffer exceeding a first level.

In another aspect, the invention includes a method of controlling the flow of information in an information network having an information network switch. The method includes allocating a first portion of a buffer of an output port of the information network switch for holding information packets received via a first input port of the information network switch and allocating a second portion of the buffer for holding information packets received via a second input port of the information network switch. The method also includes determining a level of occupancy of the first portion of the buffer and determining a level of occupancy of the second portion of the buffer. The method further includes providing a control signal to a first information packet source operably coupled to the first input port to inhibit the first information packet source from transmitting information packets to the first input port in response to the level of occupancy of the first portion of the buffer exceeding a first level. The method also includes providing a control signal to a second information packet source operably coupled to the second input port to inhibit the second information packet source from transmitting information packets to the second input port in response to the level of occupancy of the second portion of the buffer exceeding a first level.

In another aspect of the invention, an information network switch includes an output port for transmitting information packets to an information packet destination operably coupled to the output port. The output port includes a buffer for holding information packets to be transmitted to the information packet destination. The output port has a non hold state and a hold state. In the non hold state, the output port transmits information packets in the output buffer to the information packet destination. The output port transits to the hold state from the non hold state in response to the information network switch receiving a control signal provided by the information packet destination. In the hold state, the output port has a first sub-state and a second sub-state, in a first sub-state, the output port transmits information packets in the output buffer to the information packet destination. In the second sub-state, the output port does not transmit information packets to the information packet destination. The output port transits to the first sub-state from the second sub-state in response to the level of occupancy of the buffer exceeding a first level.

In another aspect of the invention, an information network switch includes a plurality of input ports for receiving information packets from information packet sources and a plurality of output ports for transmitting information packets received from the input ports to information packet destinations. Each output port includes a buffer for holding received information packets to be transmitted from the output port. The information network switch also includes means for implementing an allocated usage of each output port among the input ports.

BRIEF DESCRIPTION OF THE DRAWINGS

The present invention may be better understood, and its numerous objects, features, and advantages made apparent to those skilled in the art by referencing the accompanying drawings.

FIGS. 6A and 6B set forth one embodiment of a system for implementing flow control in an information network.

The use of the same reference symbols in different drawings indicates similar or identical items.

DETAILED DESCRIPTION

The following sets forth a detailed description of the best contemplated mode for carrying out the invention. The description is intended to be illustrative of the invention and should not be taken to be limiting.

Figure 1:
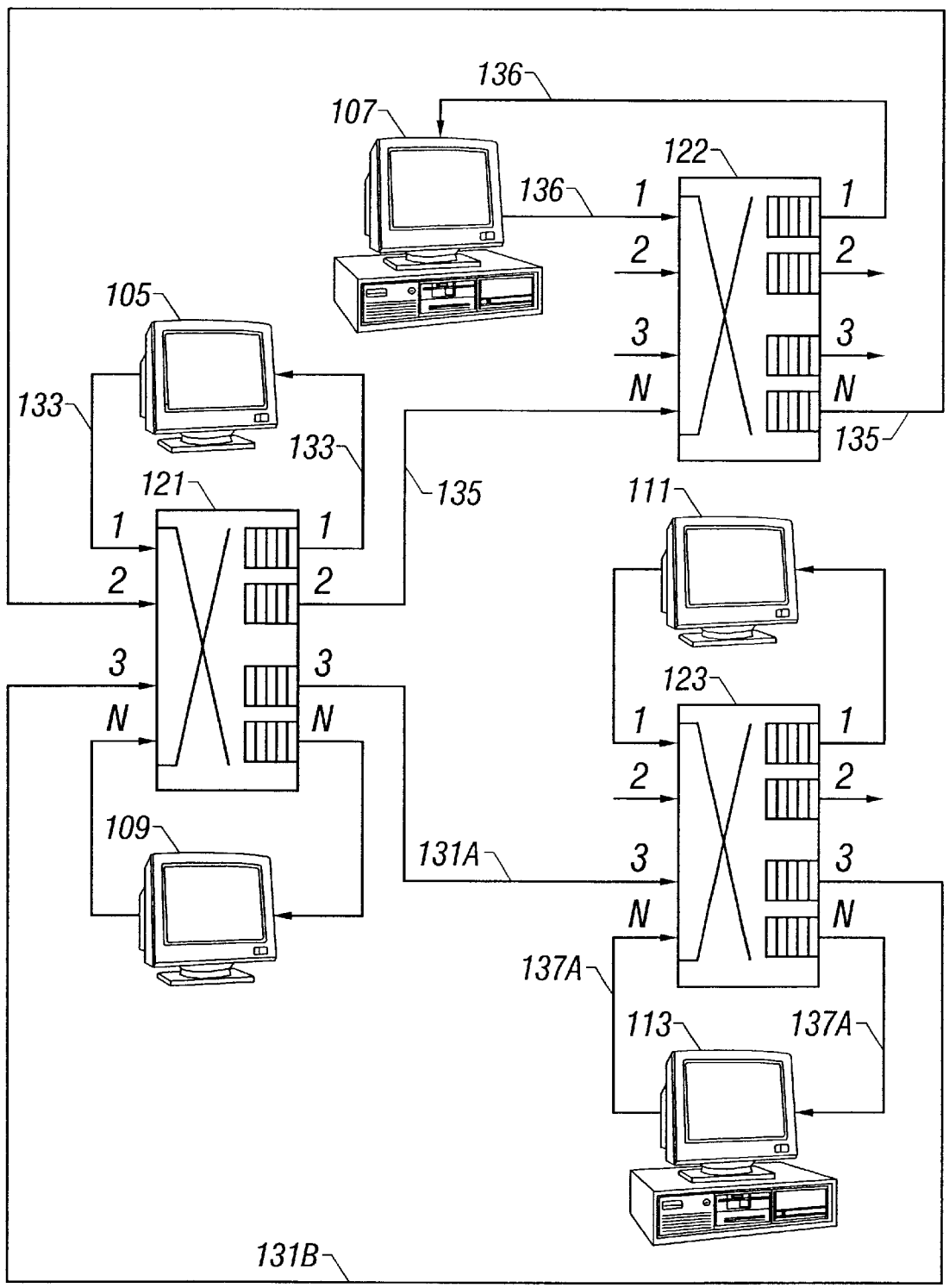
FIG. 1 shows one embodiment of an information network that allows for the transmission of information packets among information generators and information sinks operably coupled to the network.

FIG. 1 shows one embodiment of an information network that allows for the transmission of information packets among information generators and information sinks operably coupled to the network. In one embodiment, information network 101 is a computer Local Area Network (LAN) employing CSMA/CD conforming to the IEEE 802.3 standard. Information generators are devices that generate information that is transmitted in information packets on information network 101. An information sink is a device that receives and uses the information in the information packets generated by the generators. In one embodiment, the information contained in the information packets are computer data that is used by an information sink. Examples of information generators and sinks include computer workstations (such as 107), terminals (such as 105, 109, and 111), and desktop computers (such as 113). An information network allows for these information generators/sinks to be operably coupled to exchange information among each other. Other types of information generators and/or sinks include notebook computers, mainframes, servers, other types of computer systems, printers, scanners, or other devices capable of generating or receiving information over an information network.

In one embodiment, the information packets are information frames conforming to the IEEE 802.3 standard. Under the IEEE 802.3 standard, each frame contains a preamble field, a start of frame delimiter field, a destination address field, a source address field, a length of data field, a data field which contains the information to be sent to the destination, a pad field, and a checksum field.

In FIG. 1, the information generators/sinks (105 107, 109, 111, and 113) are operably coupled to each other via information network switches (121, 122, and 123) and network links (such as 131, 133, 135, 136, and 137). An information network switch is an information packet routing device that routes packets received via the input ports of the switch to the output ports as per information included in the information packet. Each information network switch includes a plurality of input ports (input ports 1 through N, as designated in FIG. 1 by the in-going arrows) for receiving information packets from information packet sources operably coupled to the input ports via network links. An information packet source may include an information packet generator such as terminal 105 or another switch (switch 121 is an information packet source for input port N of switch 122). Each information network switch also includes a plurality of output ports (output ports 1 through N, as designated by the outgoing arrows) for transmitting information packets to information packet destinations via network links operably coupled to the output ports. An information packet destination may include an information sink such as terminal 111 or another information network switch (switch 123 is an information packet destination for output port 3 of switch 121).

The switches, information packet generators, and information packet sinks are operably coupled to one another via network links. These network links may include twisted pair cable, coaxial cable, fiber optic cable, or other mechanisms for transmitting information packets. In the embodiment shown, the links are full duplex links or are bidirectional. Information packets can be exchanged in both directions between one switch and another switch or generator/sink. For example, switches 121 and 123 are operably coupled via link 131 in which information packets are provided from switch 121 to switch 123 via link 131A of link 131 and packets are provided from switch 123 from switch 121 via link 131B of link 131. In one embodiment, the links in the network may have a different data transmission rates with some links having, for example, data transmission rates of 10 Megabits per second (Mbs), 100 Mbs, or 1 Gigabits per second (Gps).

Figure 2:
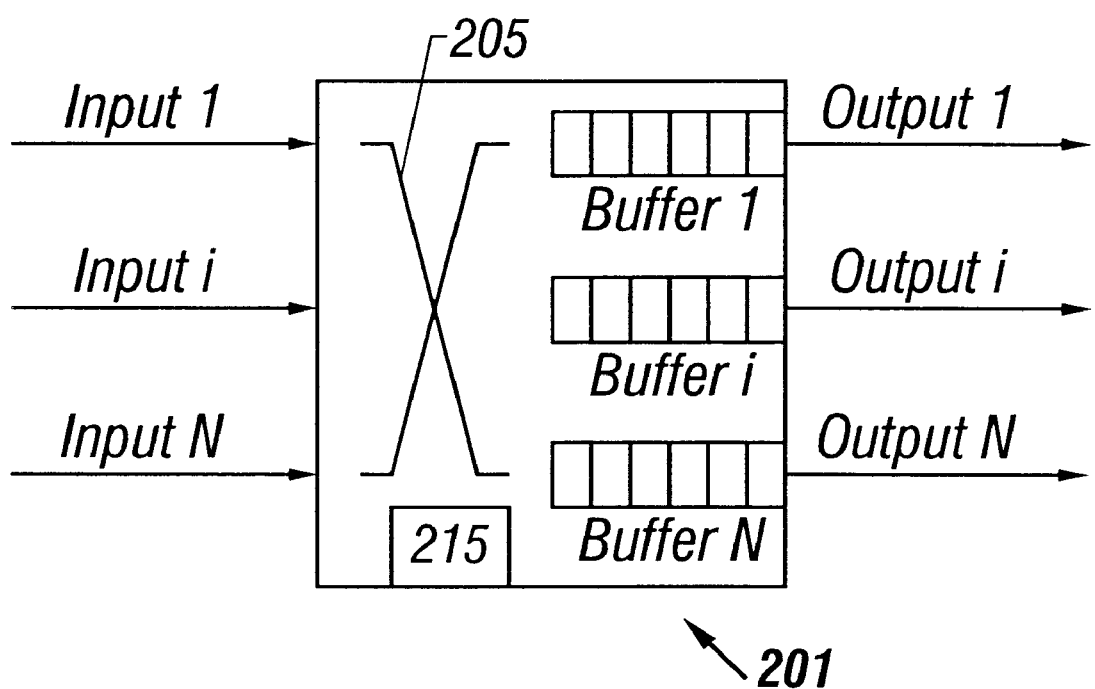
FIG. 2 shows one embodiment of an information network switch.

FIG. 2 shows one embodiment of an information network switch. Information network switch 201 is similar to information network switches 121, 122, and 123. Each output port of switch 201 includes an output buffer (buffers 1, i and N are shown in FIG. 2) for holding received information packets to be transmitted to an information packet destination via the respective output port. In one embodiment, the output buffers are FIFO buffers, wherein each output port transmits information packets held in its respective output buffer in the FIFO order.

Switch 201 includes a switching fabric 205 that is used in selectively interconnecting each input port with each output port of the information network switch. Upon receiving an information packet via one of the input ports 1 through N, the switch 205 determines whether the packet is a valid packet and whether the information packet is to be transmitted from any or all of the output ports 1 through N. In one embodiment, information network switch 201 includes a switch processing engine 215 such as a microprocessor and/or hardwired circuitry, for determining whether an information packet is valid and for determining to which of the output port(s) the received information packets are to be routed. The information network switch may also be referred to as a switch, hub, gateway, router, concentrator, or other term. In one embodiment, the network switch is a non blocking output buffered switch.

Figure 3:
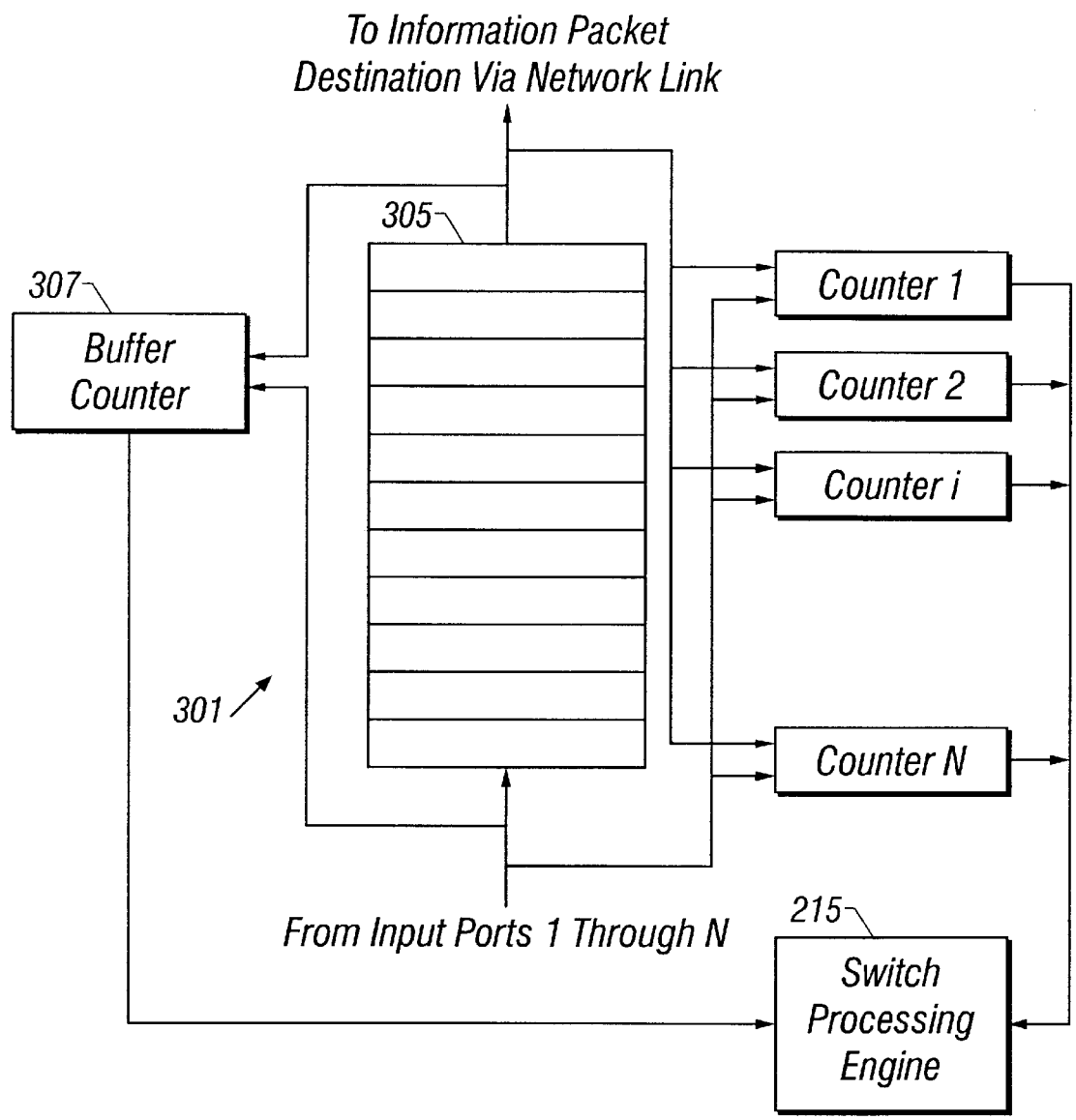
FIG. 3 shows one embodiment of an output port of an information network switch according to the present invention.

FIG. 3 shows one embodiment of an output port of an information network switch according to the present invention. Output port 301 includes FIFO output buffer 305, a buffer counter 307 and buffer counters 1 through N. Information packets received from the input ports of the switch that are to be transmitted from the output port 301 are admitted into buffer 305.

Buffer counter 307 provides a counter signal that, in the embodiment shown, is indicative of the level of occupancy of the buffer 305. With each information packet that is admitted into the buffer, buffer counter 307 is incremented by one. For each information packet held in the buffer 305 that is transmitted from output port 301, buffer counter 307 is decremented by one. Thus, the value of the counter indicates of the number of information packets in buffer 307 which, in the embodiment shown, is indicative of the level of occupancy of the buffer.

Output port 301 also includes a plurality of counters (1 through N) that, in the embodiment shown, enable a portion of the output buffer 305 to be allocated to each of the input ports of the information network switch. Each counter provides a counter signal that, in the embodiment shown, is indicative of the level of occupancy of a corresponding allocated portion of buffer 305. For example, counter 2 provides a counter signal that is indicative of the number of information packets in buffer 305 that were received from input port 2 (not shown in FIG. 3) of the switch. Counter 2 is incremented in response to an information packet received from input port 2 being admitted into buffer 305. Counter 2 is decremented in response to an information packet, received from input port 2 and held in buffer 305, being transmitted from output port 301. Each output port of a switch includes one buffer counter and a counter for each input port of the switch. The counter signals from the buffer are provided to the switch processing engine 215. In one embodiment, each counter shown in FIG. 3 includes a hardwired, up/down counter. In other embodiments, each counter is implemented by a microprocessor and a memory.

In one embodiment, network 101 incorporates a Media Access Control (MAC) sub-layer. The MAC sub-layer allows for the utilization of a control packet such as the MAC control frame named PAUSE. A PAUSE frame is provided to an information packet source by a downstream destination to inhibit transmission of information packets such as information frames by the information packet source to the downstream destination for a specified period of time. In one embodiment, the PAUSE frame contains a PAUSE opcode field and a time parameter field which contains a time parameter specifying an amount of time (in units of 64 bytes transmission time on a specified link) that an upstream information packet source must hold its transmission activity. A PAUSE(t) frame is a control frame containing t as its time parameter. Where an upstream source and a downstream destination are operably coupled via a 10 Megabits per second (Mbs) network link, a PAUSE(1) frame provided to the upstream source by the downstream destination will inhibit the upstream information source from transmitting for 51.2 microseconds. If the PAUSE frame has a time parameter equal to zero (PAUSE (0)), the upstream information packet source will immediately be enabled to transmit information packets. An indefinite pause control frame (PAUSE (∞) can be achieved by sending a PAUSE frame with a long time period and refreshing it periodically as long as the upstream device is to remain in the hold state.

In one embodiment, control packets have non preemptive priority over information packets and are not sensitive to flow control. For example, the transmission of an information packet cannot be interrupted for the transmission of a control packet. Also, the receipt of a PAUSE frame does not inhibit the receiving switch from transmitting a PAUSE frame over the blocked link.

Figure 4A:
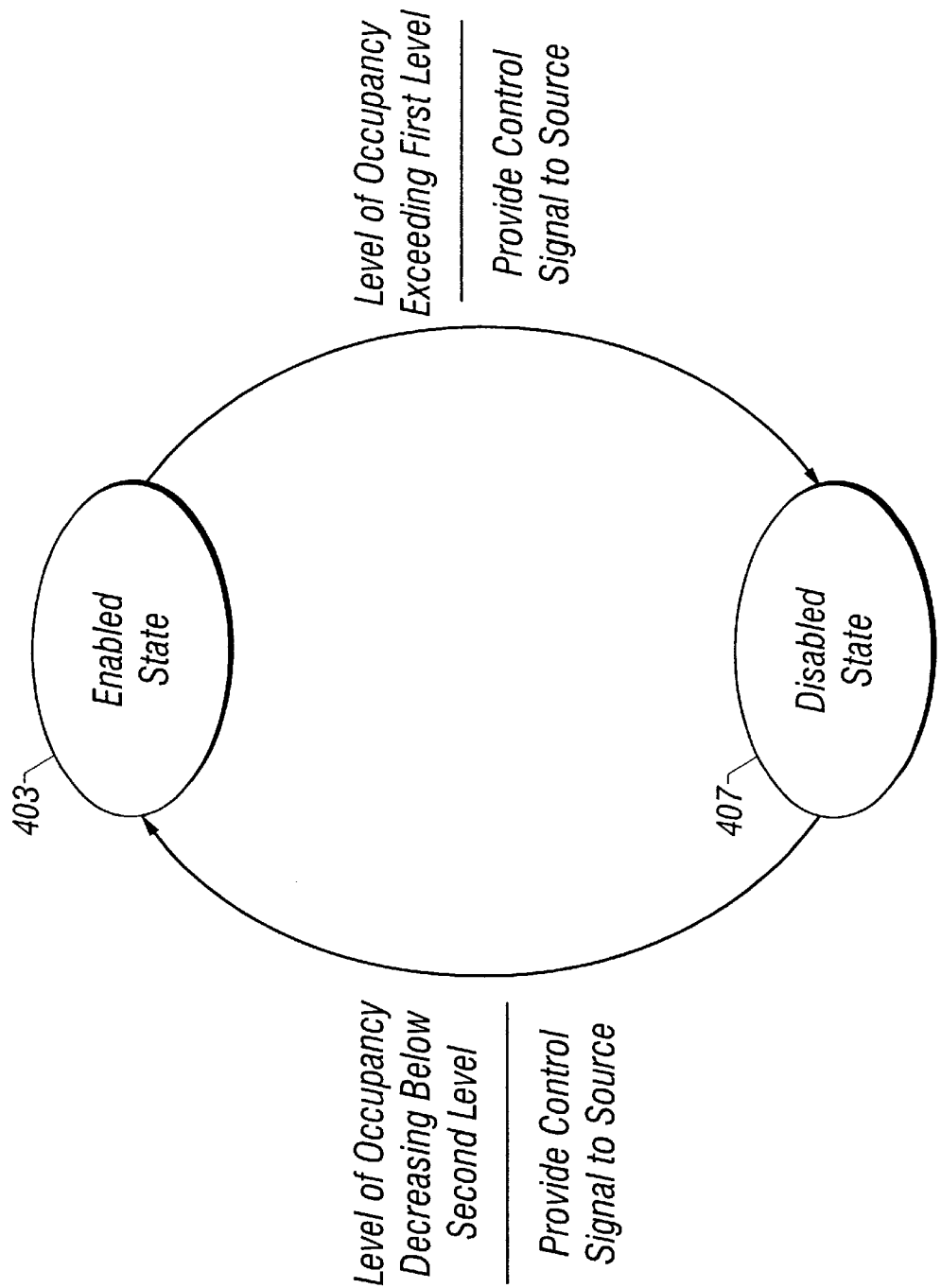
FIGS. 4A, 4B, and 4C set forth one embodiment of a system for implementing flow control in an information network.
Figure 4B:
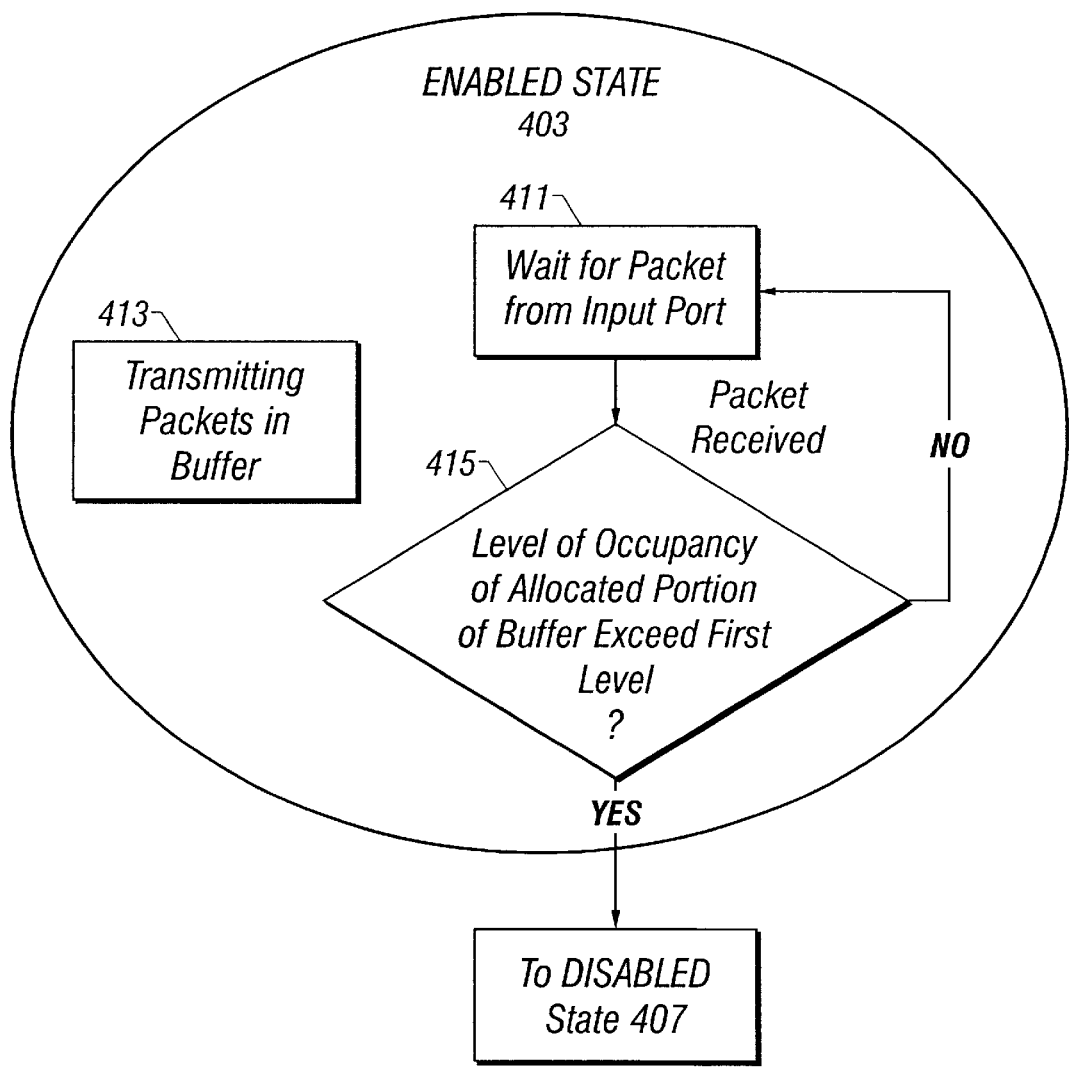
Figure 4C:
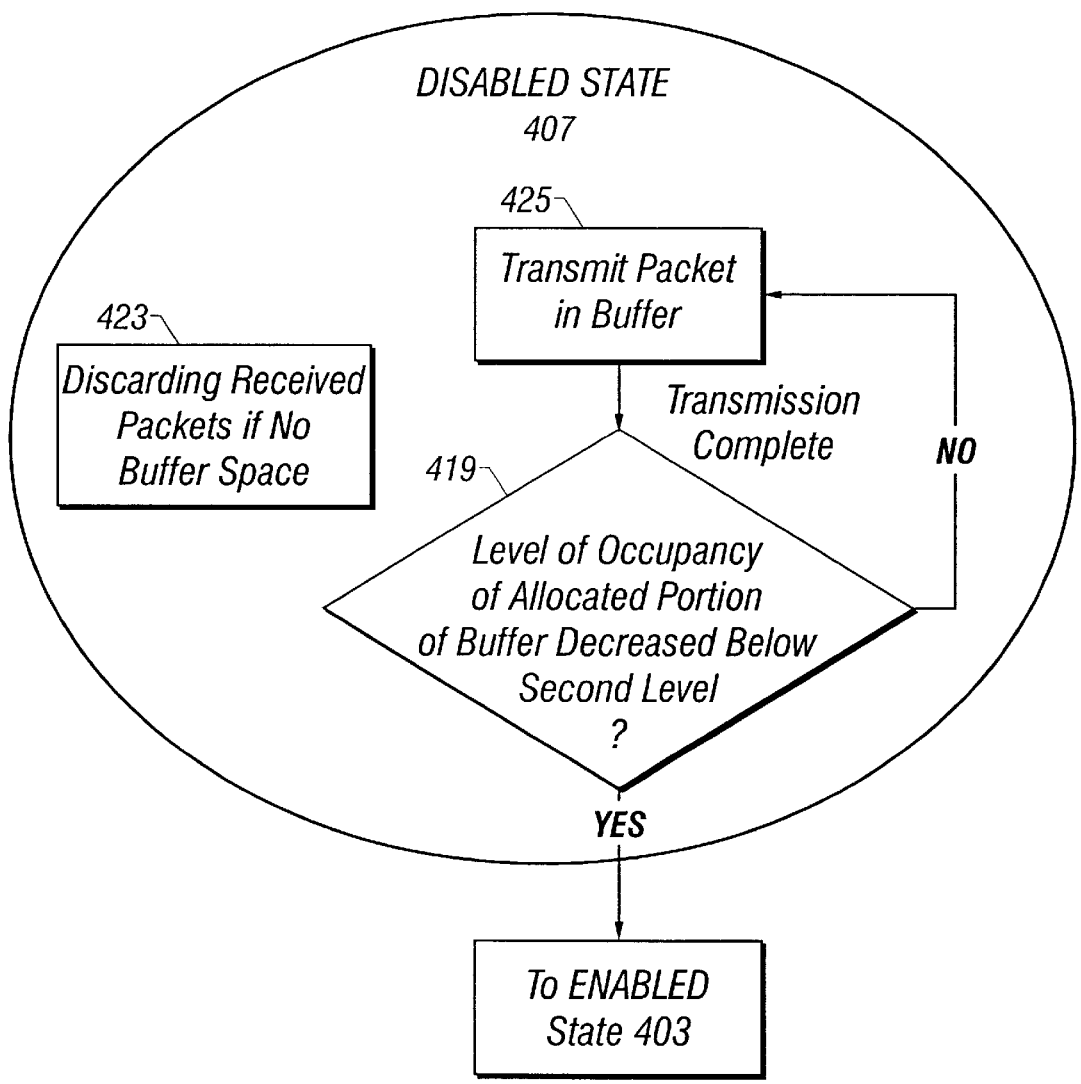

FIGS. 4A, 4B, and 4C set forth one embodiment of a system for implementing flow control in an information network utilizing the allocation of output buffers of the output ports among the input ports of the switches. In one embodiment, the system is executed by the switch processing engines of the information network switches of the information network. With buffer allocation, each input port of an information network switch is allocated a portion of the output buffer of each output port of the switch. When the level of occupancy of a portion of the buffer allocated to an input port exceeds a first level or threshold, the switch provides a control signal to the upstream sources operably coupled to the input port to inhibit information packet transmissions to the input port. Such a system advantageously allows for a fair usage of the output ports of a switch among all input ports of the switch.

Referring to FIG. 4A, each input port of the network switch has an ENABLED state 403 and a DISABLED state 407. When in the ENABLED state 403, an input port of a switch transits to the DISABLED state 407 in response to the level of occupancy of a portion of an output buffer allocated to the input port exceeding a first level or a first threshold. When an input port transits to the DISABLED state 407 from the ENABLED state 403, the information network switch provides a control signal such as a control packet (like the PAUSE (∞) frame or an equivalent PAUSE frame) to the information packet sources operably coupled to the input port to inhibit the information packet sources from transmitting information packets to the input port.

When in the DISABLED state 407, the input port transits to the ENABLED state 403 in response to the level of occupancy of the portion of the output buffer allocated to the input port decreasing below a second level or second threshold level. When an input port transits to the ENABLED state 403 from the DISABLED state 407, the switch provides a control signal such as a control packet (like the PAUSE(0) frame) to the upstream information packet source to enable the information packet source to transmit information packets to the input port.

Referring to FIG. 4B, when an input port of a network switch is in the ENABLED state 403, information packets in the output buffer of an output port are transmitted to an information destination via the output port (operation 413). In the embodiment shown, the level of occupancy of an allocated portion of an output buffer is measured in terms of the number of packets in the buffer that were received from the input port. In this embodiment, for every information packet that is received via a specific input port, the counter of the output port associated with the specific input port is decremented by one to indicate that the level of occupancy of the allocated portion of the buffer has decreased due to an information packet received from the specific input port being transmitted from the output port. For every information packet that is received from a specific input port and admitted into the output buffer of the output port, the counter of the output port associated with the specific input port is incremented by one to indicate that the level of occupancy of the allocated portion of the buffer has increased due to an information packet received from the specific input port being admitted into the output buffer.

For example, referring back to FIG. 1, to transmit an information packet from terminal 109 to terminal 111 over information network 101, terminal 109 would transmit the packet to input port N of switch 121. Switch 121 would route the packet to output port 3 of switch 121 where the packet would be admitted into the output buffer of output port 3. The packet would then be transmitted by the output port 3 of switch 121 to input port 3 of switch 123 via link 131A. Switch 123 would route the information packet to output port 1 of switch 123 where the information packet would be admitted into the output buffer of output port 1 of switch 123. When the information packet is admitted into the output buffer of output port 1 of switch 123, the counter of output port 1 associated with input port 3 of switch 123 is incremented by one to indicate that the level of occupancy of the portion of the buffer of output port 1 allocated to input port 3 has increased due to the inputting of the received packet. When the information packet is transmitted to terminal 111 via output port 1 of switch 123, the counter of output port 1 associated with input port 3 is decremented by one to indicate the decrease in the level of occupancy of the portion of the buffer allocated to input port 3.

Referring back to FIG. 4B, when the input port is in the ENABLED state 403, the switch is in a wait for packet state 411. Upon the receipt and admittance of an information packet from an input port, a determination is made (415) of whether the level of occupancy of the portion of the output buffer allocated to the input port has exceeded a first level. If the first level has been exceeded, the input port transits to the DISABLED state. If the first level has not been exceeded, the switch returns to the wait for packet state 411. In one embodiment, a counter is used to determine whether the level of occupancy of the portion of the output buffer allocated to the input port has exceeded a first level, wherein the input port transits to the DISABLED state 407 in response to the counter providing a signal indicating that the level of occupancy has exceeded the first level. In other embodiments, the switch processing engine of the switch executes a software routine stored in a memory of the switch processing engine that checks the level of occupancy of a portion of the buffer allocated to a specific input port each time an information packet has been received from the specific input port and has been admitted in the output buffer. The switch processing engine checks the level of occupancy by reading the counter signal from an associated hardware counter or by reading a signal indicative of a count stored in a memory location. In other embodiments, the frequency at which the switch processing engine checks the counter signal is dependent upon the level of occupancy of the allocated portion of the buffer. If the level of occupancy of the allocated portion of a buffer is at zero, then the switch processing engine may wait an amount of time before checking the counter, wherein the amount of time is the minimal amount of time needed for the allocated portion of the buffer to reach the first level.

Referring to FIG. 4C, when the input port is in the DISABLED state, the output port continues transmitting information packets in its output buffer. When the level of occupancy of the portion of the buffer allocated to the specific input port has decreased below a second threshold level, the input port transits to the ENABLED state.

For example, referring back to FIG. 1, in response to the level of occupancy of the portion of the output buffer of output port 1 of switch 123 allocated to input port 3 of switch 123 exceeding the first level, switch 123 provides a PAUSE ($\infty$) control frame to switch 121 to inhibit the transmission of information packets via output port 3 of switch 121. This PAUSE ($\infty$) control frame is provided to switch 121 via output port 3 of switch 123 and link 131 B. After receiving the PAUSE ($\infty$) frame, switch 121 places output port 3 of switch 121 in a hold state wherein no information frames are transmitted from output port 3 of switch 121. During the time when input port 3 of switch 123 is in the DISABLED state, output port 1 of switch 123 is transmitting the information packets held in its output buffer to terminal 111. When the level of occupancy of the allocated portion of the buffer of output port 1 of switch 123 decreases below the second level, switch 123 provides via its output port 3 and link 131B, a PAUSE(0) control frame to the input port 3 of switch 121 to enable output port 3 to transmit information packets to input port 3 of switch 123.

During the time that input port 3 of switch 123 is in the DISABLED state, other input ports of switch 123 are allowed to receive information packets and those packets addressed to output port 1 are admitted in the output buffer of output port 1. Thus, one advantage of the present invention is that heavy traffic via one input port to a specific output port will not block the other input ports from receiving information packets to be transmitted from that output port.

Referring back to FIG. 4C, upon the transmission from an output port of an information packet that was received from an input port (425), a determination is made (419) of whether the level of occupancy of the portion of the output buffer allocated to the input port has decreased below a second level. If the level of occupancy has decreased below the second level, then the input port transits to the ENABLED state 403. If the level occupancy has not decreased below the second level, the input port remains in the DISABLED state 407. In one embodiment, a counter is used to determine whether the level of occupancy of the portion of the output buffer allocated to the input port has decreased below a second level, wherein the input port transits to the ENABLED state 403 in response to the counter providing a signal indicating that the level of occupancy has decreased below the second level. In other embodiments, the switch processing engine of the switch executes a software routine stored in a memory of the switch processing engine that checks the level of occupancy of a portion of the buffer allocated to a specific input port each time an information packet received from an input port and has been transmitted from the output buffer. The switch processing engine checks the level of occupancy by reading the counter signal from an associated hardware counter or by reading a signal indicative of a count stored in a memory location.

In one embodiment, when an input port is in a DISABLED state, the switch of the input port discards information packets received via the input port in the DISABLED state (operation 423). In some embodiments, the switch discards all information packets received from the input port in the DISABLED state received after a specific period of time from when the PAUSE ($\infty$) frame or other control signal was transmitted to the upstream source to inhibit the transmission of information packets to the input port. In other embodiments, the switch would accept a specific number packets received via the input port after the PAUSE ($\infty$) frame or other control signal was provided before discarding information packets received from the disabled input port. These delayed discard features allow for the acceptance of those packets transmitted by the upstream source after the transmission of the control signal but before the upstream source receives and processes the control signal. In other embodiments, the switch of the input port in the DISABLED state would not discard the packet if the buffer of the output port had available space. Such a condition would occur when only one source is transmitting information packets to the output port at a given time and the level of occupancy of the remaining allocated portions are at low levels. In other embodiments, the switch would not discard information packets received via the disabled input port if the level of occupancy of the portion of the output buffer allocated to the disabled input port is below the first level. Such a condition may occur after the input port has become disabled for a length of time where some of the packets received from the disabled input port have been transmitted from the output buffer but not enough for the level of occupancy to decrease below the second level.

An input port of a switch may transit to the DISABLED state from the ENABLED state in response to the level of occupancy of a portion of an output buffer allocated to the input port of any output port of the switch exceeding a first level. It is understood that the "first level" for each output port buffer may be at different levels with respect to each other. Likewise, the "first levels" for the different allocated portions of an output buffer may also vary with respect to each other. For example, the "first level" for the portion of the output buffer allocated to input port 1 may be twice as large as the "first level" for the portion allocated to input port 2.

If a switch transits to the DISABLED state in response to the level of occupancy of an output buffer of a specific output port exceeding a first level, then the input port will not transit back to the ENABLED state unless the level of occupancy of the output buffer of the specific output port decreases below the second level. If an input port is in a DISABLED state due to the level of occupancy of an allocated portion of an output buffer of a first output port exceeding a first level and if the level of occupancy of a portion of a buffer of a second output port exceeds a first level, then the input port would transit to the ENABLED state in response to the level of occupancy of the allocated portions of both the first and second output ports decreasing below the second levels.

In one embodiment, the first level (the level of occupancy of an allocated portion exceeded for the transition of an input port from an ENABLED state to a DISABLED state) is higher than the second level (the level of occupancy that is decreased below for the transition of the input port to the ENABLED state from the DISABLED state). Having the first level be a higher level than the second level provides the buffer allocation flow control system of the information network switch with a hysteresis feature. This hysteresis feature reduces the number of control packets provided over the network to inhibit (and then enable) an upstream source in providing information packets when the input port transits back and forth between the DISABLED and ENABLED states. The hysteresis feature also reduces the amount of threshing (multiple transitions across a threshold in quick succession) that can result during a busy period of a switch. Threshing makes it harder on a switch to recover from an extra load. Consequently, increasing the distance between the first level and the second level reduces the number overhead of control packets transmitted and reduces problems due to threshing. However, increasing the distance between the first level and the second level increases the amount of time that the upstream source is in a hold state and correspondingly the opportunity for information packets to be discarded by the upstream source due to the upstream device's output buffer overflowing.

In one embodiment, the portions of an output buffer allocated to the various input ports of a switch may be mutually exclusive from each other. For example, if the output buffer holds 100 packets and there are 10 input ports, then the allocated portion for each input port in a mutually exclusive allocation system would be 10 packets per input port.

In other embodiments, an allocated buffer portion for an input port of a switch may be "shared" by other portions of the output buffer allocated to other input ports of the switch. In a shared system, the total amount of buffer space of the allocated portions exceeds the total amount of buffer space in the output buffer. In one embodiment of a shared allocation system, each input port is guaranteed a minimum amount of buffer space in an output buffer with the rest of the buffer space being usable by all of the input ports. Mi represents the amount of output buffer space (denoted in the number of packets) guaranteed for input port i. M represents the total buffer space (denoted in the number of packets) that is guaranteed for all of the input ports wherein:

$$M = \sum_{i=1}^{N} Mi \le B$$

where B represents the total buffer space (denoted in the number of packets) in the output buffer.

The allocated portion of an output buffer for input port i may exceed the guaranteed portion of the buffer for input port i. For such a system that employs a sharing feature of buffer allocation:

$$\sum_{i=1}^{N} Hi = f*B - (f-1)*M \text{ where } 1 \le f \le N$$

where f is the sharing factor and Hi represents the maximum buffer space (denoted in the number of packets) of the output port that can hold information packets received from input port i. For f=1, each allocated portion of the buffer is mutually exclusive with the other allocated portions and thus no sharing takes place. For f=N (the number of input ports) all buffer space (above the guaranteed buffer space M) is sharable among all of the input ports. In some shared systems, no buffer space is guaranteed for each input port.

The sharing of buffer space among the allocated portions of the output buffer advantageously allows the switch to respond to changes in the packet load received by the input ports. In systems where the number of information packets received via each port may vary widely from one period of time to the next, increasing the sharing factor allows for a more efficient utilization of the output buffer. One system where a high sharing factor is beneficial is where each input port of a switch is connected to information sources that infrequently transmit a large number of packets over a short time period. However, with a sharing factor of greater than one, a buffer may overflow without the occupancy level of any allocated portion of the buffer exceeding a first level.

Figure 5A:
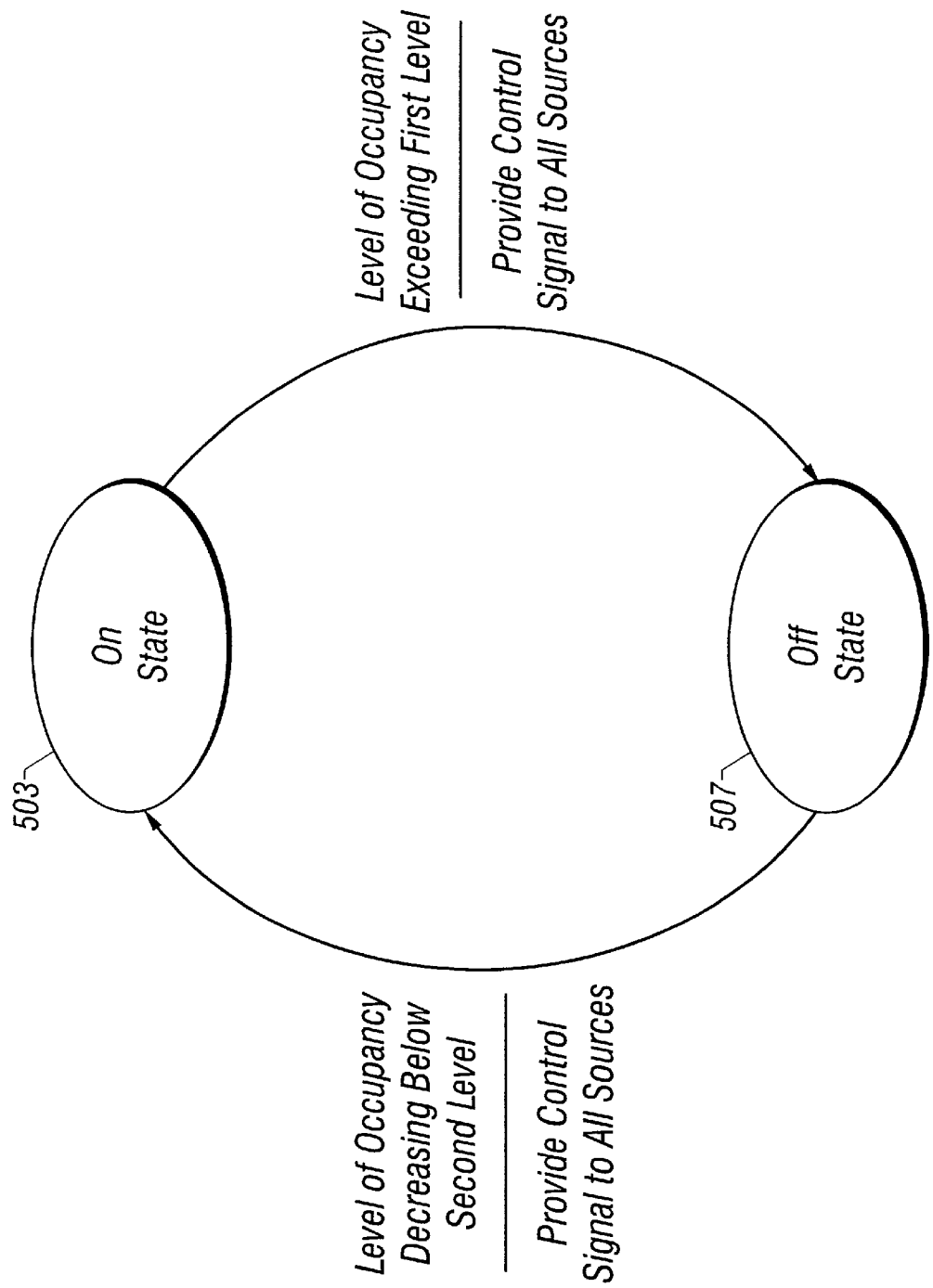
FIGS. 5A, 5B, and 5C set forth one embodiment of a system for implementing flow control that enables the system set forth in FIGS. 4A, 4B, and 4C to implement buffer sharing without overloading the output buffer.
Figure 5B:
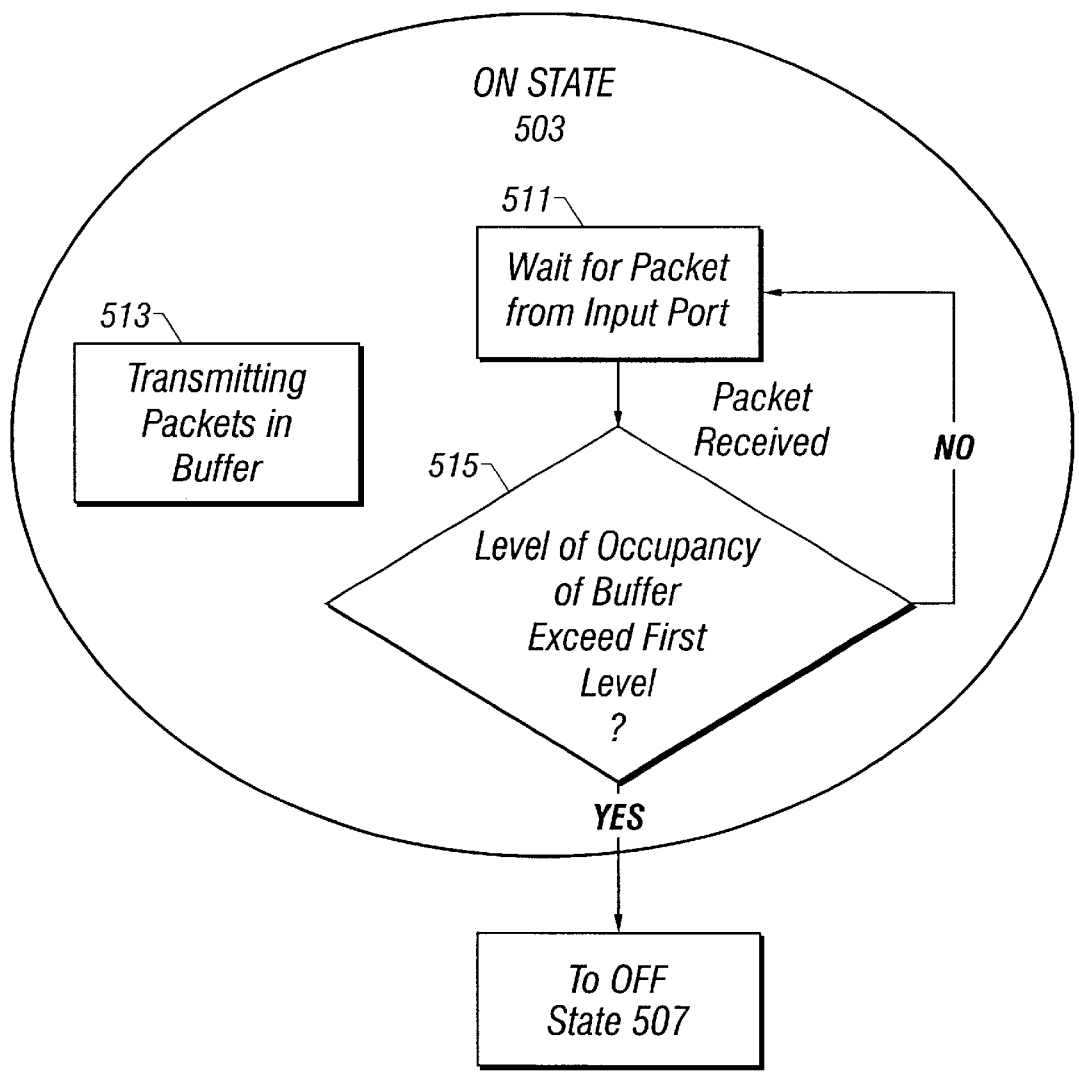
Figure 5C:
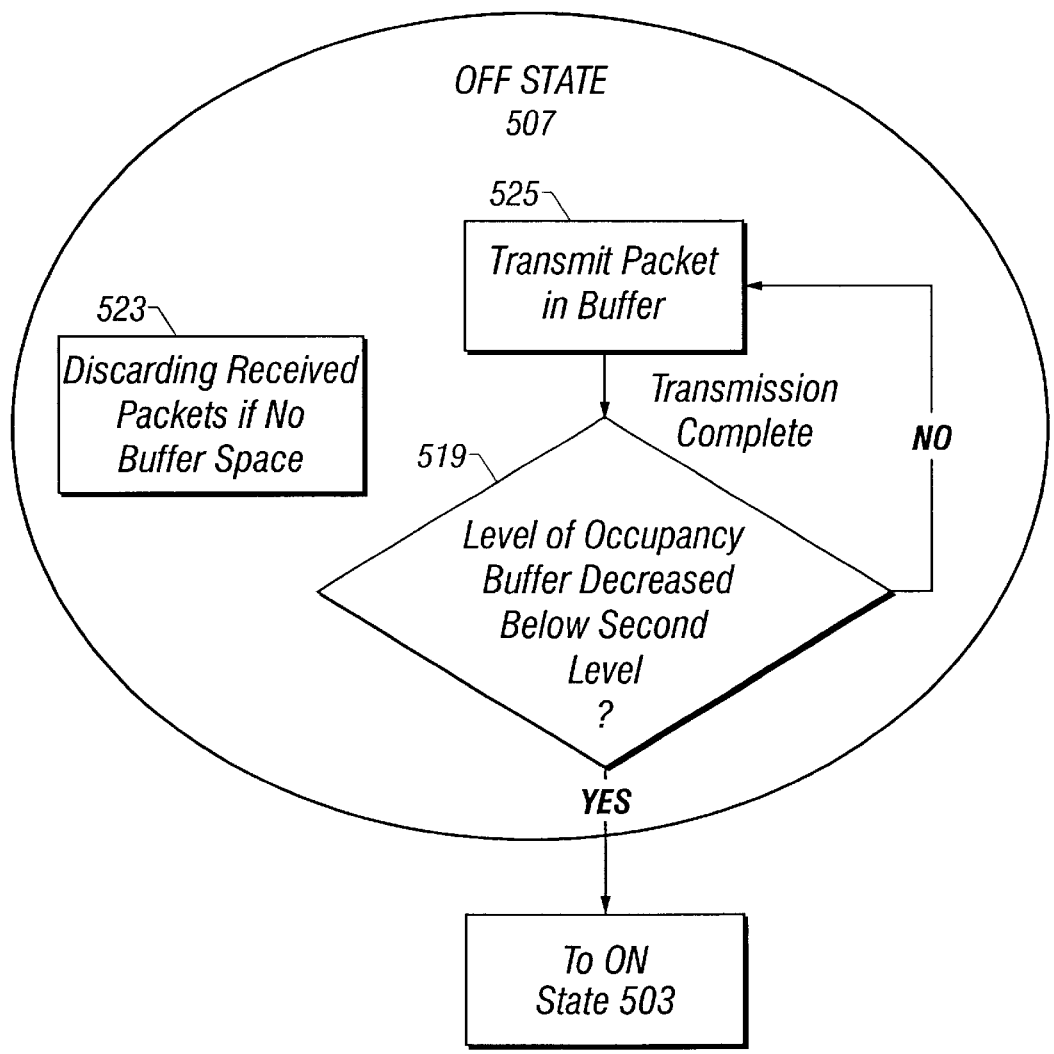

FIGS. 5A, 5B, and 5C set forth one embodiment of a system for implementing flow control that enables the system set forth in FIGS. 4A, 4B, and 4C to implement buffer sharing without causing overflow of the output buffer. Output buffer overflow for an output port implementing buffer sharing is prevented by inhibiting the information packet sources operably coupled to an information switch from providing information packets to the input ports of the information switch when the level of occupancy of the output buffer has exceeded a particular level.

Referring to FIG. 5A, each output port of an information switch has an ON state and an OFF state. The output port of a switch transits from the ON state 503 to the OFF state 507 in response to the level of occupancy of the output buffer of the output port exceeding a first level or threshold. When the output port transits to the OFF state 507 from the ON state 503, the switch provides a control packet such a PAUSE (∞) frame to each upstream information source operably coupled to an input port of the switch to inhibit the upstream information sources from transmitting information packets to the switch. The output port of a switch transits from the OFF state 507 to the ON state 503 in response to level of occupancy in the output buffer of the output port decreasing below a second level. When the output port transits to the ON state 503 from the OFF state 507, the switch provides a control packet such as the PAUSE(0) frame to each information source coupled to an input port of the switch to enable the information source to transmit information packets.

Referring to FIG. 5B, regardless of whether an output port is in the ON state 503 or in the OFF state 507, information packets held in the output buffer are transmitted to information destinations via the output port (operation 513 in the ON state). When an output port is in the ON state 503, information packets from all of the input ports are admitted into the output buffer (except from those input ports in the DISABLED state).

In the embodiment shown, the level of occupancy of an output buffer is measured in terms of the number of packets in the buffer. In one embodiment, for each information packet admitted into the output buffer, the buffer counter (such as buffer counter 307 of FIG. 3) is incremented by one. When the level of occupancy of the output buffer as indicated by the counter signal exceeds the first level, the output port transits to the OFF state 507.

In one embodiment, when the output port is in the ON state 503, the switch is in a wait for packet state 511. Upon the receipt and admittance of an information packet from any input port of the switch, a determination is made (515) of whether the level of occupancy of the output buffer has exceeded a first level. If the first level has been exceeded, then the output port transits to the OFF state. If the first level has not been exceeded, the switch returns to the wait for packet state 511. In one embodiment, a counter is used to determine whether the level of occupancy of the output buffer has exceeded a first level, wherein the output port transits to the OFF state 507 in response to the counter providing a signal indicating that the level of occupancy has exceeded the first level. In other embodiments, the switch processing engine of the switch executes a software routine stored in a memory of the switch processing engine that checks the level of occupancy of the buffer each time an information packet has been received and has been admitted in the output buffer. In other embodiments, the frequency at which the switch processing engine checks the level occupancy during a particular time is dependent upon the level of occupancy of the buffer at that particular time. The lower the level, the less often the buffer is checked.

Referring back to FIG. 1, for example, output port 1 of switch 123 transits to an OFF state from the ON state in response to the level of occupancy of the output buffer of output port 1 exceeding the first threshold level. When the output port 1 of switch 123 transits to the OFF state, switch 123 provides a PAUSE ($\infty$) frame to both switch 121 and to desktop computer 113 to inhibit these upstream sources from transmitting information packets to the input ports of switch 123. The PAUSE ($\infty$) frame is provided to switch 121 via output port 3 of switch 123, link 1311B, and input port 3 of switch 121. The PAUSE ($\infty$) is provided to desktop computer 113 via output port N of switch 123 and link 137B. While output port 1 of switch 123 is in the OFF state, information packets held in the output buffer of output port 1 are transmitted to terminal 111. In response to the level of occupancy of the output buffer of output port 1 of switch 123 decreasing below a first level, output port 1 of switch 123 transits to the ON state wherein a control packet such as the PAUSE(0) frame is provided to switch 121 and desktop computer 113.

Referring to FIG. 5C, upon the transmission from an output port of an information packet (525), a determination is made (519) of whether the level of occupancy of the output buffer has decreased below a second level. If the level of occupancy has decreased below the second level, then the output port transits to the ON state 503. If the level occupancy has not decreased below the second level, the output port remains in the OFF state 507. In one embodiment, a counter is used to determine whether the level of occupancy of the output buffer has decreased below a second level, wherein the output port transits to the ON state 503 in response to the counter providing a signal indicating that the level of occupancy has decreased below the second level. In other embodiments, the switch processing engine of the switch executes a software routine stored in a memory of the switch processing engine that checks the level of occupancy of the buffer each time an information packet has been transmitted from the output buffer. The switch processing engine checks the level of occupancy by reading the counter signal from an associated hardware counter or by reading a signal indicative of a count stored in a memory location.

In one embodiment, the first level at which the level of occupancy of an output buffer exceeds for the transition of an output port from an ON state to the OFF state is higher than the second level at which the level of occupancy decreases below for the transition of the output port to the ON state from the OFF state. This hysteresis feature reduces the number of control packets provided over the network to inhibit and then enable upstream sources in providing information packets when the output port transits back and forth between the ON and OFF states. The hysteresis feature also reduces the amount of threshing that can result during a busy period of a switch. Consequently, increasing the distance between the first level and the second level reduces the number overhead of control packets transmitted and reduces problems due to threshing. However, increasing the distance between the first level and the second level increases the amount of time that the upstream devices are in hold states and correspondingly the opportunity for information packets to be discarded by the upstream devices due to the output buffers of the upstream devices overflowing.

Referring back to FIG. 5C, in some embodiments, when the output port is in the OFF state 507, the switch of the output port discards the received information packets that are to be routed to the output port (operation 523). In some embodiments, the switch discards all information packets received after a specific period of time from when the PAUSE ($\infty$) frame or other control packet was provided to all information packet sources to inhibit the transmission of information packets to the input ports of the switch. In other embodiments, the switch would accept a specific number packets received via the input ports after the PAUSE ($\infty$) frames or other control packets were provided before discarding information packets from the input ports. These delayed discard features allow for the acceptance of those packets transmitted by the upstream sources after the transmitting of the control packets but before the upstream sources receive and process the control packets. In other embodiments, the switch of the output port in the OFF state would not discard received information packets if the buffer of the output port had available space.

To ensure that no information packets get discarded by switch when the output port transits to the OFF state, the delay discard feature is implemented to where Coff number of packets will be accepted from each input port before any frame is discarded. Coff represents the upper bound of time (denoted in the number of packets) between the transmitting of the control packet to an upstream source and when that control packet takes affect on the upstream source to inhibit the transmission of information packets.

An example of an allocation scheme that guarantees no discarding of packets by the switch due to the delay in the transmission and effect of the PAUSE ($\infty$) frame to an upstream source is as follows:

$$B-M-H \geq N^*Coff$$

wherein H is the number of packets in the output buffer at which the output port transits to the OFF state.

An example of an allocation scheme that utilizes complete sharing of the output buffer (except for the guaranteed buffer space M) among all input ports and guarantees no discarding of packets by the switch due to the delay in the transmission and effect of the PAUSE ($\infty$) frame is as follows:

$$f=N,\ Mi=0.1B/N,\ Hi=0.9B+0.1B/N,\ Li=0.8Hi,\ H=B-M-N^*Coff,\ L=0.8H$$

wherein L is the number of packets in the output buffer at which the output port transits to the ON state and wherein Li is the number of packets in an allocated portion of a buffer at which an input port transits to a disabled state.

Placing an upstream source in a hold state with a control packet such as the PAUSE ($\infty$) inhibits the upstream source from transmitting information packets. When one output port of a switch becomes congested to where a control packet is sent to inhibit the input source from transmitting information packets, the PAUSE (∞) frame inhibits the transmission of all information packets by the upstream source regardless of whether any of the packets are to be routed to the congested output port. Referring back to FIG. 1 for example, if output 1 of switch 123 becomes congested to where the level of occupancy of the output buffer exceeds the first level, output port 1 transits to the OFF state where switch 123 provides a PAUSE (∞) frame to switch 121 to inhibit output port 3 of switch 121 from transmitting information packets to input port 3 of switch 123. Even if no information packets in the output buffer of output port 3 of switch 121 are to be routed to output port 1 of switch 123, output port 3 of switch 121 is inhibited from transmitting information packets in its output buffer. Furthermore, inhibiting output port 3 of switch 121 from transmitting causes output port 3 to become congested to where switch 121 provides PAUSE (∞) frames to all upstream sources operably coupled to its input ports. Consequently, implementing flow control to enable an efficient operation for one switch may cause other upstream sources in the computer network to become congested and therefore lead to the discarding of information packets.

Figure 6B:
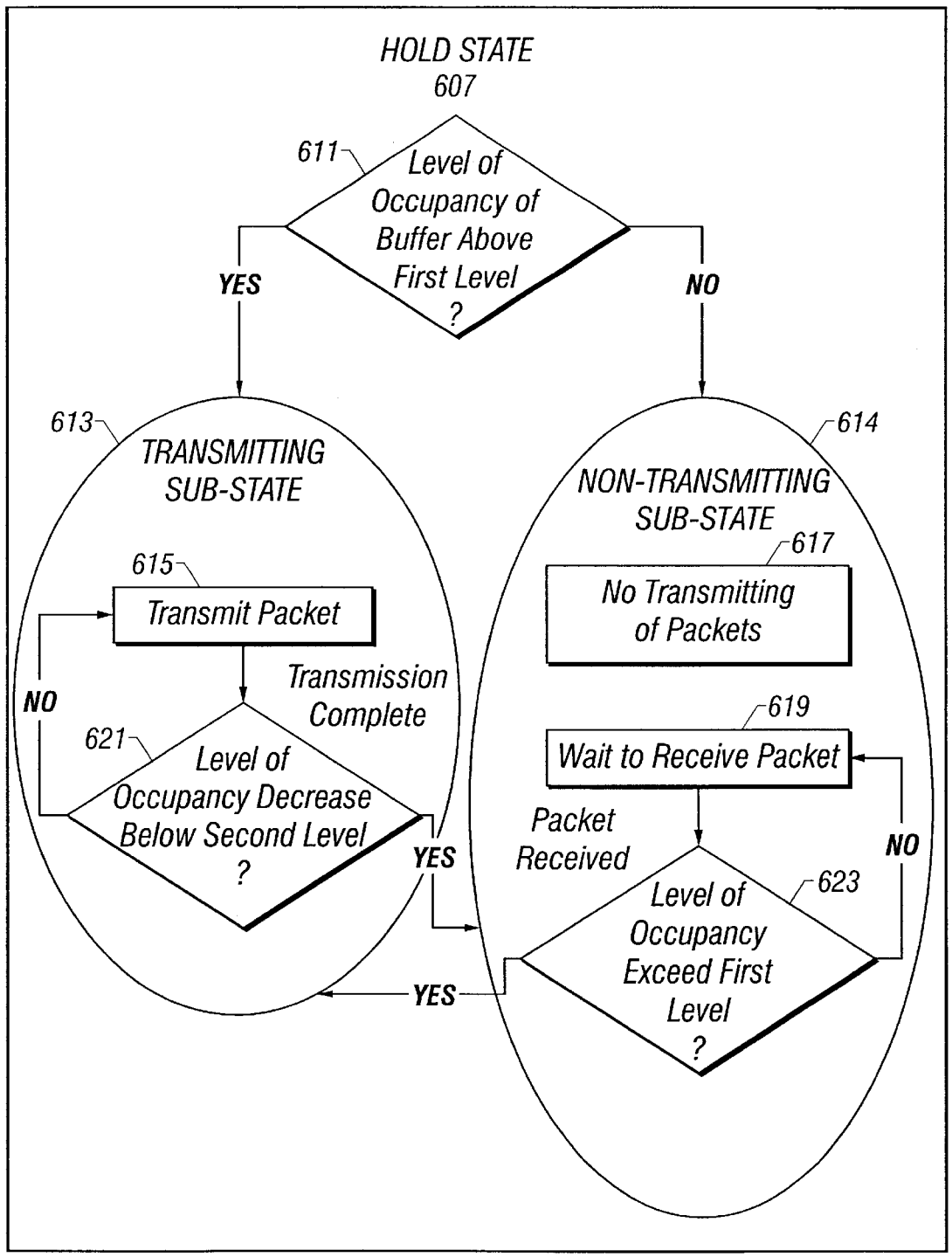

FIGS. 6A and 6B set forth a system for implementing flow control that allows upstream sources to minimize the amount of congestion in the computer network due to a downstream output port becoming congested. Referring to FIG. 6A, when an upstream information packet source is in a NO HOLD state 603, the upstream information packet source transmits information packets to the downstream destinations operably coupled to the upstream source. In response to upstream source receiving a control signal such as control packet (like a PAUSE (∞) frame) to inhibit transmission (such as when an input port of a downstream destination transits to a DISABLED state or when an output port of a down stream destination transits to an OFF state), the upstream source transits to a HOLD state 607. The upstream source transits to the NO HOLD state from the HOLD state in response to receiving a control signal such as a control packet (like the PAUSE(0) frame) to enable the upstream source to transmit information packets or in response to the expiration of the time period of the control packet that placed the upstream source in the HOLD state (such as when the upstream source is placed in a HOLD state with a PAUSE(1) frame).

Referring to FIG. 6B, when the upstream source receives the control packet to place the upstream source in the HOLD state, the upstream source determines whether the level of occupancy of the output buffer of the upstream source is above a first level. If the level of occupancy is not above the first level, the upstream source enters a NON TRANSMITTING sub-state 614. In the NON TRANSMITTING sub-state 614, the upstream source does not transmit information packets to the downstream destination that provided the control packet to inhibit the upstream source (617).

If in 611 the level of occupancy of the output buffer of the upstream source is determined to be above a first level of occupancy, then the upstream source transits to a TRANSMITTING sub-state 613 wherein the upstream source disregards the control packet provided by the downstream destination and transmits information packets to the downstream destination. In the TRANSMITTING sub-state 613, after each packet has been transmitted from the output buffer in operation 615, a determination is made in 621 of whether the level of occupancy of the output buffer of the upstream source has decreased below the second level. If the level of occupancy has not decreased below the second level, then the buffer remains in the TRANSMITTING sub-state. If the level of occupancy of the output buffer has decreased below the second level, then the upstream source transits to the NON TRANSMITTING sub-state 614. In one embodiment, the level of occupancy of the output buffer is determined with the use of a counter such as counter 307 of FIG. 3.

In the NON TRANSMITTING sub-state 614, for each packet admitted into the output buffer of the upstream source, a determination is made in 623 of whether the level of occupancy of the output buffer of the upstream source exceeds the first level. If the level of occupancy does not exceed the first level, then the upstream source remains in the NON TRANSMITTING sub-state 614. If the level of occupancy exceeds the first level after the packet has been admitted into the output buffer of the up stream source, then the upstream source transits to the TRANSMITTING sub-state 613.

For example, referring back to FIG. 1, if output 1 of switch 123 becomes congested, switch 123 provides PAUSE (∞) frames to Desktop computer 113 and to switch 121 to inhibit the transmission of information packets by desktop computer 113 and output port 3 of switch 121. If the level of occupancy of the output buffer for output port 3 of switch 121 is above a first level, then output port 3 of switch 121 transits to a TRANSMITTING sub-state where switch 121 ignores the PAUSE (∞) frame provided by switch 123 and transmits the packets in the output buffer of output port 3 to input port 3 of switch 123. Switch 123 discards the information packets received from switch 121 that are to be routed to output port 1 of switch 123 and provides the information packets that are to be routed to output ports 2, 3, and N to those output ports. When the level of occupancy in output buffer of output port 3 of switch 121 decreases below the second level, output port 3 of switch 121 transits to the NON TRANSMITTING state where output port 3 does not transmit information packets in its buffer.

An information network that includes switches whose output ports have TRANSMITTING and NON TRANSMITTING sub-states in the HOLD state advantageously allows for the output buffers of upstream switches to be selectively used as additional storage for a downstream output buffer that has become congested during those instances when the network, as a whole, is lightly loaded. Such a system also prevents a single downstream congested output port of a switch from inhibiting the flow of information packets in the network that are not destined for the congested output port.

Although the system set forth in FIGS. 6A and 6B may result in the discarding of information packets that are to be routed to the congested output port, the method reduces the discarding of information packets that are to be routed to uncongested output ports.

In other embodiments, the level of occupancy of a buffer (or of an allocated portion of a buffer) may be measured in other units other than by the number of information packets in a buffer. For example, the level of occupancy may be measured in terms of the number of bytes of the buffer being occupied by information packets versus the total number of bytes of the buffer. For example, if the size of the buffer is 4K bytes and only 2K bytes of memory hold information packets, then only one half of the buffer is being utilized at that moment. With this embodiment, each output port would include mechanisms for determining the size in bytes (or other units of data) of the information packets held in the output buffer, or include mechanisms for determining the amount of buffer space in bytes that is being used to hold information packets. Such a system would be advantageous where the size of the information packets vary widely.

In other embodiments, other types of control signals may be provided by a down stream switch to an upstream source to place the upstream source in a HOLD state when an input port of the down stream switch is transiting between ENABLE/DISABLE states or when an output port of the down stream switch is transiting between an ON/OFF states. In one embodiment, the system may have a dedicated line for conveying a discrete control signal indicating to the upstream source to either transmit or not to transmit information packages.

While particular embodiments of the present invention have been shown and described, it will be obvious to those skilled in the art that changes and modifications may be made without departing from this invention and its broader aspects and, therefore, the appended claims are to encompass within their scope all such changes and modifications as are within the true spirit and scope of this invention.

What is claimed is:

1. An information network switch comprising:
   a first input port for receiving information packets, the first input port having an enabled state and a disabled state;
   a second input port for receiving information packets, the second input port having an enabled state and a disabled state;
   an output port for transmitting information packets, the output port including:
      a buffer for holding received information packets to be transmitted from the output port, a first portion of the buffer being allocated for holding information packets from the first input port and a second portion of the buffer being allocated for holding information packets from the second input port;
   the first input port transiting to the disabled state from the enabled state in response to a level of occupancy of the first portion of the buffer exceeding a first level;
   the second input port transiting to the disabled state from the enabled state in response to a level of occupancy of the second portion of the buffer exceeding a first level.

2. The information network switch of claim 1 wherein when the first input port transits to the disabled state, the information network switch provides a control signal to an information packet source operably coupled to the first input port to inhibit the information packet source from transmitting information packets to the first input port.

3. The information network switch of claim 2 wherein when the second input port transits to the disabled state, the information network switch provides a control signal to an information packet source operably coupled to the second input port to inhibit the information packet source from transmitting information packets to the second input port.

4. The information network switch of claim 2 wherein the control signal includes a control packet.

5. The information network switch of claim 4 wherein the control packet includes a PAUSE frame substantially conforming to an IEEE 802.3 standard.

6. The information network switch of claim 1 wherein:
   the first input port transits to the enabled state from the disabled state in response to the level of occupancy of the first portion of the buffer decreasing below a second level;
   the second input port transits to the enabled state from the disabled state in response to the level of occupancy of the second portion of the buffer decreasing below a second level.

7. The information network switch of claim 6 wherein:
   when the first input port transits to the enabled state, the switch provides a control signal to an information packet source operably coupled to the first input port to enable the information packet source to send network information packets to the first input port;
   when the second input port transits to the enabled state, the switch provides a control signal to an information packet source operably coupled to the second input port to enable the information packet source to send network information packets to the second input port.

8. The information network switch of claim 6 wherein:
   the second level of the first portion of the buffer is less than the first level of the first portion of the buffer;
   the second level of the second portion of the buffer is less than the first level of the second portion of the buffer.

9. The information network switch of claim 1 wherein the buffer is a first in/first out (FIFO) buffer.

10. The information network switch of claim 1 wherein the information packets substantially conform to an IEEE 802.3 standard.

11. The information network switch of claim 1 further comprising:
    a counter providing a counter signal indicative of the level of occupancy of the first portion of the buffer, wherein the first input port transits to the disabled state in response to the counter signal indicating that the level of occupancy of the first portion of the buffer exceeds the first level.

12. The information network switch of claim 11 further comprising:
    a second counter providing a counter signal indicative of the level of occupancy of the second portion of the buffer, wherein the second input port transits to the disabled state in response to the counter signal indicating that the level of occupancy of the second portion of the buffer exceeds the first level.

13. The information network switch of claim 11 wherein, the counter is incremented in response to an information packet, received from the first input port, being admitted into the buffer, wherein the counter is decremented in response to an information packet, held in the buffer, being transmitted from the output port.

14. The information network switch of claim 1 wherein:
    the output port has an on state and an off state;
    the output port transits to the off state from the on state in response to the level of occupancy of the buffer exceeding a first level.

15. The information network switch of claim 14 wherein:
    the output port transits to the on state from the off state in response to the level of occupancy of the buffer decreasing below a second level;
    the second level being less than the first level.

16. The information network switch of claim 14 further comprising:
    a counter providing a counter signal indicative of the level of occupancy of the buffer;
    wherein the output port transits to the off state in response to the counter indicating the level of occupancy of the buffer exceeding the first level.

17. The information network switch of claim 14 wherein in response to transiting to the off state, the information network switch provides a control signal to a first information packet source operably coupled to the first input port to inhibit the first information packet source from transmitting information packets to the first input port and the switch provides a control signal to a second information packet source operably coupled to the second input port to inhibit the second information packet source from transmitting information packets to the second input port.

18. The information network switch of claim 1 further comprising:
- a second output port for transmitting information packets, the second output port including:
  - a buffer for holding received information packets to be transmitted from the second output port, a first portion of the buffer being allocated for holding information packets from the first input port and a second portion of the buffer being allocated for holding information packets from the second input port;
- the first input port transiting to the disabled state from the enabled state in response to a level of occupancy of the first portion of the buffer of the second output port exceeding a first level;
- the second input port transiting to the disabled state from the enabled state in response to a level of occupancy of the second portion of the second buffer of the second output port exceeding a first level.

19. The information network switch of claim 18 wherein:
- the first input port transits to the enabled state from the disabled state in response to the level of occupancy of the first portion of the buffer of the second output port decreasing below a second level wherein the first input port had transited to the disabled state in response to the level of occupancy of the of the first portion of the buffer of the second output port exceeding the first level;
- the second input port transits to the enabled state from the disabled state in response to the level of occupancy of the second portion of the buffer of the second output port decreasing below a second level wherein the second input port had transited to the disabled state in response to level of occupancy of the second portion of the second buffer of the second output port exceeding the first level.

20. The information network switch of claim 19 wherein:
- when the first input port transits to the disabled state, the information network switch provides a control signal to an information packet source operably coupled to the first input port to inhibit the information packet source from transmitting information packets to the first input port,
- when the second input port transits to the disabled state, the information network switch provides a control signal to an information packet source operably coupled to the second input port to inhibit the information packet source from transmitting information packets to the second input port.

21. The information network switch of claim 1 wherein:
- the information network switch discards information packets from the first input port when the first input port is in the disabled state if the level of occupancy of the buffer is at maximum capacity;
- the information network switch discards information packets from the second input port when the second input port is in the disabled state if the level of occupancy of the buffer is at maximum capacity.

22. The information network switch of claim 1 wherein:
- the level of occupancy of the first portion of the buffer is measured in terms of the number of information packets received from the first input port being held in the buffer;
- the level of occupancy of the second portion of the buffer is measured in terms of the number of information packets received from the second input port being held in the buffer.

23. The information network switch of claim 1 wherein the first portion of the buffer is sharable by the second portion of the buffer.

24. The information network switch of claim 23 wherein:
- a first part of the first portion of the buffer is exclusively allocated for holding information packets received from the first input port;
- a second part of the first portion of the buffer is useable for holding information packets received from the second input port.

25. The information network switch of claim 23 wherein:
- the second portion of the buffer is sharable by the first portion of the buffer.

26. The information network switch of claim 1 wherein:
- the first portion of the buffer is exclusively allocated for holding information packets received from the first input port;
- the second portion of the buffer is exclusively allocated for holding information packets received from the second input port.

27. The information network switch of claim 1 further comprising:
- a second information network switch including:
  - an output port for transmitting information packets to the first input port of the information network switch, the output port including:
    - a buffer for holding information packets to be transmitted to the first input port of the information network switch;
  - the output port of the second information network switch having a non hold state and a hold state, the information network switch providing a control signal to the second information network switch to place the output port of the second information network switch in the hold state from a non hold state;
  - in the hold state, the output port of the second information network switch having a first sub-state and a second sub-state, in the first sub-state, the output port of the second information network switch transmitting information packets in the output buffer of the output port of the second information network switch to the first input port, in the second sub-state, the output port of the second information network switch not transmitting information packets to the first input port;
  - the output port of the second information network switch transiting to the first sub-state from the second sub-state in response to the level of occupancy of the buffer of the output port of the second information network switch exceeding a first level.

28. The information network switch of claim 27 wherein the control signal includes a control packet.

29. A method of controlling the flow of information in an information network having an information network switch comprising:
- allocating a first portion of a buffer of an output port of the information network switch for holding information packets received via a first input port of the information network switch;
- allocating a second portion of the buffer for holding information packets received via a second input port of the information network switch;

determining a level of occupancy of the first portion of the buffer;

determining a level of occupancy of the second portion of the buffer;

providing a control signal to a first information packet source operably coupled to the first input port to inhibit the first information packet source from transmitting information packets to the first input port in response to the level of occupancy of the first portion of the buffer exceeding a first level;

providing a control signal to a second information packet source operably coupled to the second input port to inhibit the second information packet source from transmitting information packets to the second input port in response to the level of occupancy of the second portion of the buffer exceeding a first level.

30. The method of claim 29 wherein the control signal includes a control packet.

31. The method of claim 30 wherein the control packet includes a PAUSE frame substantially conforming to the IEEE 802.3 standard.

32. The information network switch of claim 29 further comprising;

providing a control signal to the first information packet source to enable the first information packet source to transmit network information packets to the first input port in response to the level of occupancy of the first portion of the buffer decreasing below a second level after a control signal has been provided to the first information packet source to inhibit the first information packet source from transmitting information packets to the first input port;

providing a control signal to the second information packet source to enable the second information packet source to transmit information packets to the second input port, in response to the level of occupancy of the second portion of the buffer decreasing below a second level after a control signal has been provided to the second information packet source to inhibit the second information packet source from transmitting information packets to the second input port.

33. The method of claim 29 wherein the level of occupancy of the first portion of the buffer is determined using a counter;

the level of occupancy of the second portion of the buffer is determined using a counter.

34. The method of claim 29 further comprising:

determining the level of occupancy of the buffer;

in response to the level of occupancy of the buffer exceeding a first level, providing a control signal to the first information packet source to inhibit the first information packet source from transmitting information packets to the first input port and providing a control signal to the second information packet source to inhibit the second information packet source from transmitting information packets to the second input port.

35. The method of claim 29 wherein the network information packets substantially conform to the IEEE 802.3 standard.

36. An information network switch comprising:

an output port for transmitting information packets to an information packet destination operably coupled to the output port, the output port including:

a buffer for holding information packets to be transmitted to the information packet destination;

the output port having a non hold state and a hold state, in the non hold state, the output port transmits information packets in the output buffer to the information packet destination, the output port transiting to the hold state from the non hold state in response to the information network switch receiving a control signal provided by the information packet destination;

in the hold state, the output port having a first sub-state and a second sub-state, in a first sub-state, the output port transmits information packets in the output buffer to the information packet destination, in the second sub-state, the output port not transmitting information packets to the information packet destination;

the output port transiting to the first sub-state from the second sub-state in response to the level of occupancy of the buffer exceeding a first level.

37. The information network switch of claim 36 wherein output port transits to the second sub-state from the first sub-state in response to the level of occupancy of the buffer decreasing below a second level.

38. The information network switch of claim 36 wherein the information packets substantially conform to an IEEE 802.3 standard.

39. The information network switch of claim 36 wherein the control signal provided to the information network switch from the information packet destination includes a control packet.

40. The information network switch of claim 39 wherein the control signal includes a PAUSE frame substantially conforming to an IEEE 802.3 standard.

41. An information network switch comprising:

a plurality of input ports for receiving information packets from information packet sources;

a plurality of output ports for transmitting information packets received from the input ports to information packet destinations, each output port including a buffer for holding received information packets to be transmitted from the output port;

means for implementing an allocated usage of each output port among the input ports, the means for implementing further including:

means for allocating a portion of each buffer of each output port of the plurality to each input port; and means for providing a control signal to an information packet source operably coupled to an input port of the plurality to inhibit the information packet source from transmitting information packets to the input port in response to the level of occupancy of a portion of a buffer of an output port of the plurality allocated to the input port exceeding a first level.

* * * * *